(12) United States Patent
Takei et al.

(10) Patent No.: US 11,904,577 B2
(45) Date of Patent: Feb. 20, 2024

(54) HOT-MELT ADHESIVE RESIN FILM AND PRODUCTION METHOD THEREOF

(71) Applicant: FUJIMORI KOGYO CO., LTD., Tokyo (JP)

(72) Inventors: Kunihiro Takei, Tokyo (JP); Yuiko Maruyama, Tokyo (JP); Hirokazu Iizuka, Tokyo (JP)

(73) Assignee: FUJIMORI KOGYO CO., LTD., Tokyo (JP)

( * ) Notice: Subject to any disclaimer, the term of this patent is extended or adjusted under 35 U.S.C. 154(b) by 555 days.

(21) Appl. No.: 17/034,334

(22) Filed: Sep. 28, 2020

(65) Prior Publication Data

US 2021/0008854 A1     Jan. 14, 2021

Related U.S. Application Data

(62) Division of application No. 15/748,990, filed as application No. PCT/IB2016/001087 on Aug. 3, 2016, now Pat. No. 11,007,756.

(30) Foreign Application Priority Data

Aug. 6, 2015 (JP) .................. 2015-156366

(51) Int. Cl.
| | |
|---|---|
| *B32B 7/12* | (2006.01) |
| *B32B 27/08* | (2006.01) |
| *B29C 48/08* | (2019.01) |
| *B29C 48/21* | (2019.01) |
| *B29C 48/00* | (2019.01) |
| *B32B 27/32* | (2006.01) |
| *B32B 27/38* | (2006.01) |
| *C09J 125/08* | (2006.01) |
| *C09J 123/26* | (2006.01) |
| *C08L 23/06* | (2006.01) |
| *C08L 23/20* | (2006.01) |
| *C09J 7/35* | (2018.01) |
| *B32B 27/00* | (2006.01) |
| *C09J 151/06* | (2006.01) |
| *C09J 163/00* | (2006.01) |
| *C09J 7/29* | (2018.01) |
| *B32B 27/20* | (2006.01) |
| *B32B 27/30* | (2006.01) |
| *B32B 27/34* | (2006.01) |
| *B05D 1/26* | (2006.01) |
| *B29K 9/00* | (2006.01) |
| *B29K 19/00* | (2006.01) |
| *B29K 23/00* | (2006.01) |
| *B29K 33/00* | (2006.01) |
| *B29K 63/00* | (2006.01) |
| *B29K 105/00* | (2006.01) |

(52) U.S. Cl.
CPC ............ *B32B 27/08* (2013.01); *B29C 48/022* (2019.02); *B29C 48/08* (2019.02); *B29C 48/21* (2019.02); *B32B 27/00* (2013.01); *B32B 27/20* (2013.01); *B32B 27/302* (2013.01); *B32B 27/32* (2013.01); *B32B 27/325* (2013.01); *B32B 27/327* (2013.01); *B32B 27/34* (2013.01); *B32B 27/38* (2013.01); *C08L 23/06* (2013.01); *C08L 23/20* (2013.01); *C09J 7/29* (2018.01); *C09J 7/35* (2018.01); *C09J 123/26* (2013.01); *C09J 125/08* (2013.01); *C09J 151/06* (2013.01); *C09J 163/00* (2013.01); *B05D 1/265* (2013.01); *B29K 2009/00* (2013.01); *B29K 2019/00* (2013.01); *B29K 2023/06* (2013.01); *B29K 2023/12* (2013.01); *B29K 2033/08* (2013.01); *B29K 2063/00* (2013.01); *B29K 2105/0097* (2013.01); *B32B 2250/05* (2013.01); *B32B 2250/24* (2013.01); *B32B 2250/40* (2013.01); *B32B 2270/00* (2013.01); *B32B 2307/306* (2013.01); *B32B 2405/00* (2013.01); *C09J 2301/124* (2020.08); *C09J 2301/304* (2020.08); *C09J 2423/006* (2013.01); *C09J 2451/00* (2013.01); *C09J 2463/00* (2013.01); *Y10T 428/2813* (2015.01); *Y10T 428/2848* (2015.01)

(58) Field of Classification Search
None
See application file for complete search history.

(56) References Cited

U.S. PATENT DOCUMENTS

| | | | |
|---|---|---|---|
| 5,370,941 A | 12/1994 | Kiang | |
| 6,156,841 A | 12/2000 | Noritomi et al. | |
| 6,773,806 B1 * | 8/2004 | Nakagawa | ............ C08L 23/08 |
| | | | 428/343 |
| 10,077,383 B2 | 9/2018 | Takamori | |

(Continued)

FOREIGN PATENT DOCUMENTS

| | | | | |
|---|---|---|---|---|
| CA | 2874227 A1 * | 10/2013 | ............. | C08L 53/02 |
| EP | 0301867 A2 * | 2/1989 | ............ | C09J 151/06 |

(Continued)

OTHER PUBLICATIONS

Akahisa Inou et al., "Multilayer Hot Melt Film and Laminate Thereof", English translation of JP H10138418 A, May 26, 1998 (Year: 1998).*

(Continued)

*Primary Examiner* — Anish P Desai
(74) *Attorney, Agent, or Firm* — HAUPTMAN HAM, LLP

(57) ABSTRACT

A hot-melt adhesive resin film includes a first adhesive layer, a first intermediate layer, a substrate layer having heat resistance, a second intermediate layer, and a second adhesive layer, which are laminated in this order, in which the first adhesive layer and the second adhesive layer include an acid-modified polyolefin resin.

8 Claims, 1 Drawing Sheet

(56) References Cited

U.S. PATENT DOCUMENTS

| | | | |
|---|---|---|---|
| 11,007,756 B2 * | 5/2021 | Takei | B32B 27/327 |
| 11,148,401 B2 * | 10/2021 | Takei | B32B 27/302 |
| 2003/0153686 A1 * | 8/2003 | Onoe | C08F 297/083 |
| | | | 525/227 |
| 2006/0199915 A1 | 9/2006 | Izumi et al. | |
| 2006/0222980 A1 | 10/2006 | Makino et al. | |
| 2009/0068483 A1 * | 3/2009 | Morikawa | B32B 27/306 |
| | | | 525/70 |
| 2009/0110861 A1 | 4/2009 | Sherman | |
| 2012/0021156 A1 | 1/2012 | Devisme et al. | |
| 2016/0036013 A1 | 2/2016 | Nakazato et al. | |
| 2019/0001635 A1 | 1/2019 | Takei et al. | |

FOREIGN PATENT DOCUMENTS

| | | | |
|---|---|---|---|
| JP | H4197633 A | 7/1992 | |
| JP | H8190902 A | 7/1996 | |
| JP | H10076618 A | 3/1998 | |
| JP | H10138418 A | 5/1998 | |
| JP | 2000084442 A | 3/2000 | |
| JP | 2001011209 A | 1/2001 | |
| JP | 2003041019 A | 2/2003 | |
| JP | 2004095543 A | 3/2004 | |
| JP | 2004237543 A | 8/2004 | |
| JP | 2004266105 A | 9/2004 | |
| JP | 2005243757 A | 9/2005 | |
| JP | 2007144918 A | 6/2007 | |
| JP | 2009206101 A | 9/2009 | |
| JP | 2010126709 A | 6/2010 | |
| JP | 2010260998 A | 11/2010 | |
| JP | 2011011396 A | 1/2011 | |
| JP | 2013028738 A | 2/2013 | |
| JP | 2013091702 A | 5/2013 | |
| JP | 2014218633 A | 11/2014 | |
| JP | 5700166 B1 | 4/2015 | |
| JP | 2015105345 A | 6/2015 | |
| JP | 2016122619 A | 7/2016 | |
| WO | 2012090732 A1 | 7/2012 | |
| WO | 2013162059 A1 | 10/2013 | |

OTHER PUBLICATIONS

Iizuka, Hirokazu et all., "Adhesive Resin Composition, Adhesive Resin Molded Body, and Adhesive Resin Laminate", machine translation of JP 2013091702 A, May 16, 2013 (Year: 2013).*

Decision to Grant for European Patent Application No. 16840892.0 dated Jun. 18, 2020; 2 pgs.

Notice of Allowance for Japanese Patent Application No. 2015-156366 dated Mar. 10, 2020; 5 pgs.

Office Action for Japanese Patent Application No. 2015-156366 dated Jun. 25, 2019, with English translation; 14 pgs.

Extended European Search Report for European Patent Application No. 16840892.0, dated Feb. 11, 2019, 7 pgs.

Written Opinion for PCT/IB2016/001087, dated Oct. 11, 2016, 12 pages.

Third Party Observation for PCT/IB2016/001087, dated Nov. 9, 2017, 5 pages.

Inoue et al., Multilayer Hot Melt Film and Laminate Thereof, English translation of JP H10-138418A, May 26, 1998; 19 pgs.

Hirokazu, Iizuka et al., "Adhesive Resin Composition, Adhesive Resin Molded Body, and Adhesive Resin Laminate", machine translation of JP 2013-091702A, May 16, 2013; 18 pgs.

International Search Report dated Oct. 11, 2016 for PCT/IB2016/001087, 4pp.

Extended European Search Report for European Patent Application No. 20178747.0 dated Oct. 8, 2020; 6 pgs.

Extended European Search Report for European Patent Application No. 20178753.8 dated Oct. 8, 2020; 7 pgs.

Opposition Decision for Japanese Patent No. 6688574 dated Nov. 18, 2021; 69 pgs.

Notice of Allowance in corresponding European Patent Application No. 20178747.0, dated Sep. 22, 2022; 42 pgs.

Notice of Allowance in corresponding European Patent Application No. 20178753.8 dated Oct. 5, 2022; 44 pgs.

* cited by examiner

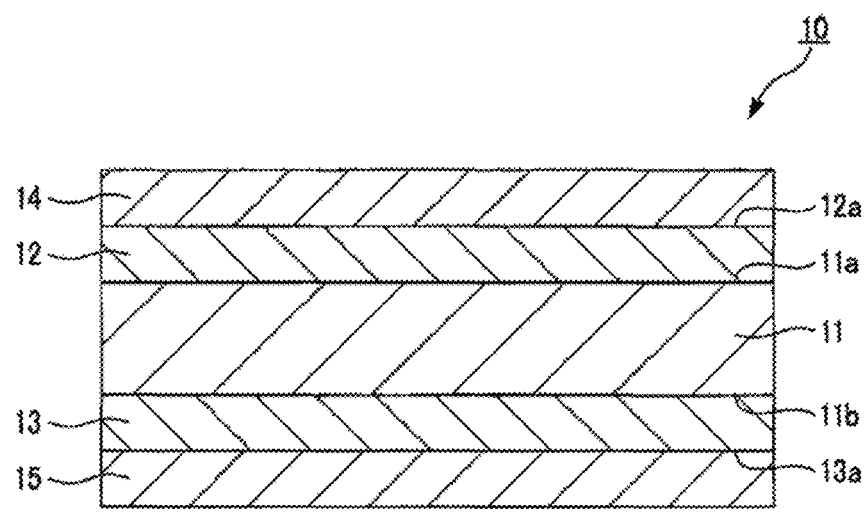

HOT-MELT ADHESIVE RESIN FILM AND PRODUCTION METHOD THEREOF

CROSS REFERENCE TO RELATED APPLICATION

This Application is a Divisional of U.S. application Ser. No. 15/748,990, filed Jan. 30, 2018, which is a National Phase of PCL/IB2016/001087 filed on Aug. 3, 2016, which, in turn, claimed the priority of Japanese Patent Application No. 2015-156366 which was filed on Aug. 6, 2015, the contents of which are all incorporated herein by reference.

TECHNICAL FIELD

The present invention relates to a hot-melt adhesive resin film having excellent adhesiveness to various adherends, particularly metal, and a production method thereof.

BACKGROUND TECHNOLOGY

Previously, as an adhesive film which adheres to an adherend, a laminated film composed of a three-layer structure in which a thermosetting epoxy-based adhesive layer is formed on both sides of a substrate consisting of a heat-resistant resin film, as described in Patent Document 1, has been known, but it was not sufficient, with relation to adhesiveness to metal and durability.

Additionally, in the previous adhesive film, when adhesion with metal in particular is performed, adhesiveness is not sufficient, and adhesiveness could not also be retained after the severe durability conditions. Additionally, in the previous adhesive film having no substrate, there was a problem that when prepared into a laminate, the strength for keeping the laminate planar is not sufficient, and distortion is generated in the laminate. On the other hand, there was a problem that even when adhesion is performed using an adhesive film having a substrate, peeling occurs between layers of a laminate, and the sufficient strength as an adhesive cannot be retained.

DOCUMENTS OF RELATED ART

Patent Document
  Patent Document 1: Japanese Unexamined Patent Application, First Publication No. 2013-028738

SUMMARY OF THE INVENTION

Problem to be Solved by the Invention

The present invention was made in view of the above-mentioned circumstances, and an object thereof is to provide a hot-melt adhesive resin film which does not cause peeling between respective layers, has an excellent adhesive force, and has strong durability even in severe durability evaluation, to various planar or film-like adherends such as metal, glass, and plastic, and a production method thereof.

Means for Solving the Problem

The present inventors investigated minutely and studied regarding an adhesive resin film also manifesting high durability in severer evaluation than before, to various planar or film-like adherends such as metal, glass, and plastic, and found out the lamination configuration of the present invention, resulting in completion of the present invention. That is, the present inventors found out the configuration that a heat-resistant substrate is provided on a substrate layer to secure the strength as a laminate, a resin layer having high adherence with a substrate and high adherence with a surface layer is provided as an intermediate layer, acid-modified polyolefin is contained in a surface layer, and the acid-modified polyolefin in the surface layer secures adhesiveness with an adherend, resulting in completion of the present invention.

In order to solve the above-mentioned problems, the present invention provides a hot-melt adhesive resin film comprising a first adhesive layer, a first intermediate layer, a substrate layer having heat resistance, a second intermediate layer, and a second adhesive layer, which are laminated in this order, wherein the first adhesive layer and the second adhesive layer include an acid-modified polyolefin resin.

It is preferable that the first adhesive layer and the second adhesive layer include, as a material for forming the layers, a composition having an acid-modified polyolefin resin and an epoxy group-containing resin, or a composition having an acid-modified polyolefin resin and an oxazoline group-containing resin.

It is preferable that the first adhesive layer and the second adhesive layer contain 80 parts by mass to 99.9 parts by mass of an acid-modified polyolefin resin (A), and 0.1 parts by mass to 20 parts by mass of an epoxy group-containing polyolefin-based resin (B) having a main chain which is obtained by copolymerizing an olefin compound and an epoxy group-containing vinyl monomer, and a side chain bound to the main chain, and having a melting point of 80° C. to 120° C.

It is preferable that the first adhesive layer and the second adhesive layer contain 90 parts by mass to 99.9 parts by mass of an acid-modified polyolefin resin (A), and 0.1 parts by mass to 10 parts by mass of a phenol novolak-type epoxy resin (C) which is solid at an ambient temperature.

It is preferable that the first adhesive layer and the second adhesive layer contain 80 parts by mass to 99.9 parts by mass of an acid-modified polyolefin resin (A), and 0.1 parts by mass to 20 parts by mass of an oxazoline group-containing styrene-based resin (D) having a number average molecular weight of 50,000 to 250,000.

It is preferable that the first intermediate layer and the second intermediate layer are at least one selected from the group consisting of polypropylene, metallocene-based polyethylene, and metallocene-based polypropylene, and a material for forming the substrate layer contains a cyclic olefin polymer.

It is preferable that the first intermediate layer and the second intermediate layer are at least one selected from the group consisting of a methylpentene polymer, a polybutene-based elastomer, and polypropylene, and the substrate layer is formed of a methylpentene polymer.

It is preferable that the substrate layer includes an inorganic filler.

Also, the present invention provides a method of producing the above-mentioned hot-melt adhesive resin film, the method comprising producing the hot-melt adhesive resin film by a coextrusion method so as to laminate a first adhesive layer, a first intermediate layer, a substrate layer having heat resistance, a second intermediate layer, and a second adhesive layer in this order.

Effects of Invention

According to the present invention, a hot-melt adhesive resin film having an excellent adhesive force and durability, to various adherends such as metal, glass, and plastic can be provided. Particularly, a hot-melt adhesive resin film excellent in adhesion with metal can be provided.

BRIEF DESCRIPTION OF THE DRAWINGS

FIG. 1 is a cross-sectional view showing a schematic configuration of a hot-melt adhesive resin film which is one embodiment of the present invention.

BEST MODE FOR CARRYING OUT THE INVENTION

An embodiment of the hot-melt adhesive resin film of the present invention and a production method thereof will be illustrated.

In addition, the present embodiment more specifically illustrates the gist of the invention, but does not limit the present invention, unless particularly instructed.

[Hot-Melt Adhesive Resin Film]

FIG. 1 is a cross-sectional view showing a schematic configuration of the hot-melt adhesive resin film which is one embodiment of the present invention.

As shown in FIG. 1, a hot-melt adhesive resin film 10 of the present embodiment comprises a substrate layer 11 having heat resistance, a first intermediate layer 12 which is laminated on one side 11a of the substrate layer 11, a second intermediate layer 13 which is laminated on the other side 11b of the substrate layer 11, a first adhesive layer 14 which is laminated on a side (hereinafter, referred to as "one side") 12a of the first intermediate layer 12 opposite to the substrate layer 11, and a second adhesive layer 15 which is laminated on a side (hereinafter, referred to as "one side") 13a of the second intermediate layer 13 opposite to the substrate layer 11. That is, the hot-melt adhesive resin film 10 has the five-layer configuration that first adhesive layer 14/first intermediate layer 12/substrate layer 11/second intermediate layer 13/second adhesive layer 15 are laminated in this order as shown in FIG. 1.

A resin constituting the substrate layer 11 is not particularly limited as far as it is a resin having sufficient heat resistance, and examples thereof include synthetic resin films formed of polyester resins such as polyethylene naphthalate (PEN), polyethylene terephthalate (PET), and polybutylene terephthalate (PBT); polyolefin polymers such as a cyclic olefin polymer (COP) and a methylpentene polymer (TPX); and the like.

Among them, resins having a low linear expansion coefficient are preferable.

By using resins having a low linear expansion coefficient, contraction of a laminate becomes small when the laminate is heated or cooled, and a strain of a laminate including metal becomes small.

As the resin used for the substrate layer 11, PEN, COP or TPX is preferable, and COP or TPX is more preferable.

Additionally, as an additive, a particulate or fibrous filler can be introduced into the substrate layer 11. The filler may be a filler having high heat resistance, and includes an organic filler and an inorganic filler. By introducing the filler, a contractive force of the hot-melt adhesive resin film 10 can further be suppressed, and the strength of the hot-melt adhesive resin film 10 itself can also be enhanced. In the present invention, it is preferable to add the inorganic filler from a view point of heat resistance and contractility of the substrate layer.

Examples of the inorganic filler include carbonates such as calcium carbonate, magnesium carbonate, and barium carbonate; sulfates such as calcium sulfate, magnesium sulfate, and barium sulfate; chlorides such as sodium chloride, calcium chloride, and magnesium chloride; oxides such as aluminum oxide, calcium oxide, magnesium oxide, zinc oxide, titanium oxide, and silica; minerals such as talc, smectite, mica, and kaolinite; carbon compounds such as carbon fiber and carbon particles; and fine particles consisting of glass. Additionally, examples of a shape include a spherical shape, a bar-like shape, a plate-like shape and the like, and a plate-like compound is preferable.

A thickness of the substrate layer 11 is preferably 25 μm to 250 μm, more preferably 40 μm to 200 μm, and further preferably 70 μm to 190 μm.

Additionally, a thickness of the substrate layer 11 is preferably about 20% to 70% of a thickness of a whole hot-melt adhesive resin film 10 (that is, the total thickness of substrate layer 11, first intermediate layer 12, second intermediate layer 13, first adhesive layer 14, and second adhesive layer 15).

The first intermediate layer 12 is a layer having adhesiveness to the substrate layer 11 and the first adhesive layer 14. On the other hand, the second intermediate layer 13 is a layer having adhesiveness to the substrate layer 11 and the second adhesive layer 15.

Adhesiveness which is required for the first intermediate layer 12 and the second intermediate layer 13 refers to the strength for retaining the strength as the laminate of the substrate layer 11 and the first adhesive layer 14 or the second adhesive layer 15, and when adhesiveness is high, inter-layer peeling becomes difficult to occur.

A material constituting the first intermediate layer 12 and the second intermediate layer 13 is not particularly limited, as far as the first intermediate layer 12 and the second intermediate layer 13 have the above-mentioned adhesiveness, but the material is appropriately selected depending on a material constituting the substrate layer 11.

When the material constituting the substrate layer 11 is a cyclic olefin polymer (COP), the material constituting the first intermediate layer 12 and the second intermediate layer 13 is preferably at least one selected from the group consisting of acid-modified polypropylene, metallocene-based polyethylene, and metallocene-based polypropylene. That is, as the material constituting the first intermediate layer 12 and the second intermediate layer 13, one selected from the group consisting of polypropylene, metallocene-based polyethylene, and metallocene-based polypropylene may be used alone, or two or more may be used by combining them. Particularly, in order to prevent the occurrence of inter-layer peeling, it is preferable that two or more are combined, and it is more preferable that three or more are contained.

For example, when the material constituting the first intermediate layer 12 and the second intermediate layer 13 consists of three components of acid-modified polypropylene, metallocene-based polyethylene, and metallocene-based polypropylene, it is preferable that a blending amount of acid-modified polypropylene is 10 parts by mass to 40 parts by mass, a blending amount of metallocene-based polyethylene is 30 parts by mass to 50 parts by mass, and a blending amount of metallocene-based polypropylene is 30 parts by mass to 40 parts by mass, and it is particularly preferable that a blending amount of acid-modified polypropylene is 20 parts by mass, a blending amount of metallocene-based polyethylene is 50 parts by mass, and a blending amount of metallocene-based polypropylene is 30 parts by mass, when a total of these three components is let to be 100 parts by mass.

Examples of acid-modified polypropylene include ADMER NB508, NF518, LB548, QB510, QB550, LB548, NE518, NF528, LF128, LF308, NF308, NF518, NF528, QF500, QF551, NF528, NF548, QF500, QF551, SF731, QF551, QF570, SF715, SF731, SE800, NF518, NF528, HE040, NE065, HE040, NE065, NE090, XE070, QE060, NR106, and NS101 manufactured by Mitsui Chemicals, Inc., and the like.

Examples of metallocene-based polyethylene include Harmolex NF324A, NF375B, NT366A, NF384A, NF444A, NF464A, NC564A, NF325A, NF464A, NF444N, NH645A, NH745A, NH845N, and NJ744N manufactured by Japan Polyethylene Corporation; EVOLUE SP0510, SP1020, SP1520, SP1210, SP2020, and SP2320 manufactured by Prime Polymer Co., Ltd.; and the like.

Examples of metallocene-based polypropylene include WINTEC WFX6, WFW5T, WFX4M, WXK1233, WFX4TA, WFW4M, WMG3B, WMH02, WMX03, WSX02, WMG03, and WMG03UX manufactured by Japan Polypropylene Corporation, and the like.

When the resin constituting the substrate layer 11 is a methylpentene polymer (TPX), it is preferable that the first intermediate layer 12 and the second intermediate layer 13 are formed of at least one selected from the group consisting of a methylpentene polymer, a polybutene-based elastomer, and polypropylene. That is, as the resin constituting the first intermediate layer 12 and the second intermediate layer 13, at least one selected from the group consisting of a methylpentene polymer, a polybutene-based elastomer, and polypropylene may be used alone, or two or more may be used by combining them. Particularly, in order to prevent the occurrence of inter-layer peeling, it is preferable to combine three or more. In addition, as the methylpentene polymer, an acid-modified methylpentene polymer may be used.

For example, when the resin constituting the first intermediate layer 12 and the second intermediate polymer 13 consists of four components of a methylpentene polymer, an acid-modified methylpentene polymer, a polybutene-based elastomer, and polypropylene, a blending amount of the methylpentene polymer is preferably 10 parts by mass to 70 parts by mass and more preferably 20 parts by mass to 50 parts by mass, a blending amount of the acid-modified methylpentene polymer is preferably 0 parts by mass to 50 parts by mass and more preferably more than 0 parts by mass and not more than 30 parts by mass, a blending amount of the polybutene-based elastomer is preferably 5 parts by mass to 40 parts by mass and more preferably 10 parts by mass to 30 parts by mass, and a blending amount of polypropylene is preferably 5 parts by mass to 40 parts by mass and more preferably 10 parts by mass to 30 parts by mass, when a total of these four components is let to be 100 parts by mass.

Examples of the methylpentene polymer include RT18, MX002, MX004, DX820, DX231, and DX310 manufactured by Mitsui Chemicals, Inc., and the like.

Examples of the polybutene-based elastomer include BL2491 and PB5640M manufactured by Mitsui Chemicals, Inc., and the like.

As polypropylene, maleic acid-modified polypropylene and random polypropylene are suitably used.

A thickness of the first intermediate layer 12 and the second intermediate layer 13 is preferably 0.1 µm to 5 µm and more preferably 0.5 µm to 4 µm.

Additionally, a total thickness of the first intermediate layer 12 and the second intermediate layer 13 is preferably about 5% to 40% of a thickness of a whole hot-melt adhesive resin film 10 (that is, the total thickness of substrate layer 11, first intermediate layer 12, second intermediate layer 13, first adhesive layer 14, and second adhesive layer 15).

The resin constituting the first intermediate layer 12 and the resin constituting the second intermediate layer 13 may be the same or different, in such a range that the first intermediate layer 12 and the second intermediate layer 13 satisfy the above-mentioned adhesiveness.

The first adhesive layer 14 and the second adhesive layer 15 are formed of a composition having an acid-modified polyolefin resin and an epoxy group-containing resin or a composition having an acid-modified polyolefin resin and an oxazoline group-containing resin. More particularly, the first adhesive layer and the second adhesive layer are formed of a composition having an acid-modified polyolefin resin and an epoxy group-containing polyolefin-based resin (first adhesive resin composition), a composition having an acid-modified polyolefin resin and a phenol novolak-type epoxy resin (second adhesive resin composition), or a composition having an acid-modified polyolefin resin and an oxazoline group-containing styrene-based resin (third adhesive resin composition).

Plastic which is an adherend to be adhered using the hot-melt adhesive resin film 10 of the present embodiment is not particularly limited, but adhesion with a polyolefin-based, polyester-based or polyamide-based adherend is excellent.

A metal plate which is an adherend to be adhered using the hot-melt adhesive resin film 10 of the present embodiment is not particularly limited, and the generally known metal plate, metal planar plate or metal foil can be used. A metal of the metal plate may be, for example, iron, copper, aluminum, lead, zinc, titanium or chromium, or may be alloy such as stainless, or a metal or a non-metal, a surface of which has been treated by plating with metal or coating processing with a paint containing metal. Particularly preferable is a metal planar plate or a metal foil consisting of iron, aluminum, titanium, stainless or a surface-treated metal, and the firm adhesive strength can be realized.

[First Adhesive Resin Composition]

The first adhesive resin composition contains 80 parts by mass to 99.9 parts by mass of an acid-modified polyolefin resin (A) and 0.1 parts by mass to 20 parts by mass of an epoxy group-containing polyolefin-based resin (B) having a main chain which is obtained by copolymerizing an olefin compound and an epoxy group-containing vinyl monomer, and a side chain bound to the main chain, and having a melting point of 80° C. to 120° C.

Hereinafter, the acid-modified polyolefin resin (A) may be referred to as "(A) component", and the epoxy group-containing polyolefin-based resin (B) may be referred to as "(B) component".

(Acid-Modified Polyolefin Resin (A))

In the first adhesive resin composition, the acid-modified polyolefin resin (A) is a polyolefin-based resin modified with unsaturated carboxylic acid or a derivative thereof, having an acid functional group such as a carboxyl group or a carboxylic anhydride group in the polyolefin-based resin.

The (A) component is obtained by modification of a polyolefin-based resin with unsaturated carboxylic acid or a derivative thereof, copolymerization of an acid functional group-containing monomer and olefins, or the like. Among them, the (A) component which was obtained by acid-modifying the polyolefin-based resin is preferable.

Examples of the add-modifying method include graft modification of melting and kneading the polyolefin resin and the acid functional group-containing monomer in the presence of a radial polymerization initiator such as an organic peroxide or an aliphatic azo compound.

Examples of the above-mentioned polyolefin-based resin include polyethylene, polypropylene, poly-1-butene, polyisobutylene, a random copolymer of propylene with ethylene or α-olefin, a block copolymer of propylene with ethylene or α-olefin, and the like. Among them, a polypropylene-based resin such as homopolypropylene (propylene homopolymer; hereinafter, sometimes referred to as "homo PP"), a propylene-ethylene block copolymer (hereinafter, sometimes referred to as "block PP"), and a propylene-ethylene random copolymer (hereinafter, sometimes referred to as "random PP") is preferable, and random PP is particularly preferable.

Examples of the above-mentioned olefins when they are copolymerized include olefin-based monomers such as ethylene, propylene, 1-butene, isobutylene, 1-hexene, and α-olefins.

The acid functional group-containing monomer is a compound having an ethylenic double bond, and a carboxyl group or a carboxylic anhydride group in the same molecule, and examples thereof include various unsaturated monocarboxylic acids, dicarboxylic acids, or acid anhydrides of dicarboxylic acids.

Examples of the acid functional group-containing monomer having a carboxyl group (carboxyl group-containing monomer) include α,β-unsaturated carboxylic acid monomers such as acrylic acid, methacrylic acid, maleic acid, nadic acid, fumaric acid, itaconic acid, citraconic acid, crotonic acid, isocrotonic acid, tetrahydrophthalic acid, and endo-bicyclo[2.2.1]-5-heptene-2,3-dicarboxylic acid (endic acid).

Examples of the acid functional group-containing monomer having a carboxylic anhydride group (carboxylic anhydride group-containing monomer) include unsaturated dicarboxylic anhydride monomers such as maleic anhydride, nadic anhydride, itaconic anhydride, citraconic anhydride, and endic anhydride.

As these acid functional group-containing monomers, one may be used alone, or two or more may be used by combining them, in the (A) component.

Among them, as the acid functional group-containing monomer, an acid functional group-containing monomer having an acid anhydride group is preferable, a carboxylic anhydride group-containing monomer is more preferable, and maleic anhydride is particularly preferable, due to high reactivity with a (B) component described later.

When a part of the acid functional group-containing monomer used in acid-modification is unreacted, it is preferable to use, as an (A) component, a component from which an unreacted acid functional group-containing monomer has been removed in advance, in order to prevent reduction in an adhesive force due to an unreacted acid functional group-containing monomer.

In the (A) component, an amount of a component derived from the polyolefin-based resin or olefins is preferably 50 parts by mass or more, based on a total amount of 100 parts by mass of the (A) component.

A melting point of the (A) component is preferably 100° C. to 180° C., in view of a temperature at which the (A) component and the (B) component described later are melted and kneaded. By using the (A) component having a melting point in the above-mentioned range, the (A) component and the (B) component described later can be melted and kneaded at a temperature sufficiently higher than a melting point of the (A) component, also when the conventional method and the general apparatus are used. Additionally, when the (A) component and the (B) component described later are reacted by melting and kneading, it is preferable that a melting point of the (B) component is lower as compared with that of the (A) component, and a degree of freedom of selection of the (B) component can be enhanced by using the (A) component having a melting point in the above-mentioned range.

Additionally, as described above, it is preferable that a melting point of the (A) component is higher than a melting point of the (B) component described later, and a melting point of the (A) component is higher than a melting point of the (B) component more preferably by 10° C. or more, further preferably by 20° C. or more, and particularly preferably by 30° C. or more. By that a melting point of the (A) component is sufficiently higher than a melting point of the (B) component, upon melting and kneading, the (B) component is melted earlier, and permeated into the (A) component in the state where a shape of the resin is retained, to react therewith uniformly, and as a result, good durability can be obtained.

Among them, as the (A) component, maleic anhydride-modified polypropylene is preferable, from a viewpoint of adhesiveness and a moderate melting point.

(Epoxy Group-Containing Polyolefin-Based Resin (B))

In the first adhesive resin composition, the epoxy group-containing polyolefin-based resin (B) is a resin having a main chain which is obtained by copolymerizing an olefin compound and an epoxy group-containing vinyl monomer, and a side chain bound to the main chain, and having a melting point of 80° C. to 120° C.

Main Chain

The main chain of the (B) component is obtained by copolymerizing an olefin compound, an epoxy group-containing vinyl monomer, and another arbitrary monomer which is used as needed.

Examples of the above-mentioned olefin compound include olefin-based monomers such as ethylene, propylene, 1-butene, isobutylene, 1-hexene, and α-olefin.

Examples of the above-mentioned epoxy group-containing vinyl monomer include glycidyl esters such as glycidyl methacrylate (GMA) and glycidyl acrylate; glycidyl ethers such as allyl glycidyl ether; epoxyalkenes such as epoxybutene; and the like.

As the olefin compound and the epoxy group-containing vinyl monomer, one may be used alone, or two or more may be used by combining them, respectively.

The main chain of the (B) component may contain one or more other monomers in addition to the olefin compound and the epoxy group-containing vinyl monomer. Examples of other monomers are not particularly limited, as far as they can be copolymerized with the olefin compound and the epoxy group-containing vinyl monomer, but include a (meth)acrylate monomer, a (meth)acrylic ester monomer, a (meth)acrylamide monomer, a styrene monomer, and the like.

In the copolymer which is to be the main chain of the (B) component, a constituting ratio of each monomer (compound) is not particularly limited, and a copolymer which is obtained by copolymerizing the epoxy group-containing vinyl monomer at 10% by mass to 30% by mass, and more preferably 10% by mass to 20% by mass, based on all monomers constituting the main chain of the (B) component is preferable. By using the epoxy group-containing vinyl monomer in the above-mentioned range, adhesiveness with an adherend can be suitably improved.

Among them, as the main chain of the (B) component, a copolymer which is obtained by copolymerizing the olefin compound and the epoxy group-containing vinyl monomer is preferable, and a copolymer of ethylene and glycidyl methacrylate is particularly preferable.

Side Chain

The (B) component can improve properties such as the strength, adhesiveness, and synthesis of the olefin-based copolymer, by having a side chain bound to the above-mentioned main chain. The side chain is not particularly limited, but examples thereof include styrene-based resins (polymers containing styrene) such as polystyrene and a styrene-acrylonitrile copolymer; (meth)acrylic-based resins which are obtained by polymerizing one or more of alkyl (meth)acrylate monomers such as methyl (meth)acrylate, ethyl (meth)acrylate, butyl (meth)acrylate, and pentyl (meth)acrylate; and the like.

Among them, as the side chain of the (B) component, polymers containing styrene are preferable, and examples thereof include polystyrene and a. styrene-acrylonitrile copolymer. Among them, polystyrene is particularly preferable.

The (B) component having the above-mentioned main chain and side chain can be obtained, for example, by graft polymerization of a main chain copolymer which was obtained by the conventional method, a monomer constituting the side chain, and a radical polymerization initiator such as an organic peroxide or an aliphatic azo compound.

A melting point of the (B) components is 80° C. to 120° C., and preferably 90° C. to 110° C. The (B) component having such a melting point can be obtained by appropriately selecting monomer species constituting the main chain and the side chain.

By using the (B) component having a melting point in the above-mentioned range, it becomes possible to melt and knead the above-mentioned (A) component and (B) component at a temperature sufficiently higher than a melting point of the relevant (B) component also when the conventional method and the general apparatus are used, and an adhesive and an adhesive layer having excellent durability can be obtained. Additionally, when the above-mentioned (A) component and (B) component are reacted using melting and kneading, it is preferable that a melting point of the (B) component is lower as compared with that of the (A) component, and a degree of freedom of selection of the (A) component can be enhanced by using the (B) component having a melting point in the above-mentioned range.

As such (B) component, commercially available products such as Modiper A1100, A4100, and A4400 (all are product names) manufactured by NOF CORPORATION can also be used.

In the first adhesive resin composition, the (A) component is contained at 80 parts by mass to 99.9 parts by mass, whereas the (B) component is contained at 0.1 parts by mass to 20 parts by mass. More specifically, it is preferable that a proportion of the (A) component is 90 parts by mass to 99 parts by mass and a proportion of the (B) component is 1 part by mass to 10 parts by mass in the solid contents of the first adhesive resin composition.

If desired, a miscible additive, an additional resin, a plasticizer, a stabilizer, a coloring agent, and the like can be appropriately contained in the first adhesive resin composition.

It is thought that both of an acid functional group of the (A) component and an epoxy group of the (B) component function as adhesive functional groups to an adherend, and thereby, the first adhesive resin composition becomes possible to exert excellent adhesiveness to various adherends such as metal, glass, and plastic.

Additionally, it is thought that a part of an acid functional group of the (A) component and a part of an epoxy group of the (B) component are reacted to reinforce a dispersion structure of the (A) component and the (B) component, and thereby, good durability together with excellent adhesiveness is obtained.

[Second Adhesive Resin Composition]

The second adhesive resin composition contains 90 parts by mass to 99.9 parts by mass of an acid-modified polyolefin resin (A) and 0.1 parts by mass to 10 parts by mass of a phenol novolak-type epoxy resin (C) which is solid at an ambient temperature.

Hereinafter, the acid-modified polyolefin resin (A) may be referred to as "(A) component", and the phenol novolak-type epoxy resin (C) may be referred to as "(C) component".

(Acid-Modified Polyolefin Resin (A))

In the second adhesive resin composition, the acid-modified polyolefin resin (A) is the same as the acid-modified polyolefin resin (A) in the above-mentioned first adhesive resin composition.

(Phenol Novolak-Type Epoxy Resin (C))

In the second adhesive resin composition, the phenol novolak-type epoxy resin (C) is a phenol novolak-type epoxy resin which is solid at an ambient temperature. By using the (C) component which is solid at an ambient temperature, also when the above-mentioned (A) component and (C) component are polymerized by melting and kneading, melting and kneading can be performed in conformity with a melting temperature of the (A) component, and it allows properties of the (C) component to be hardly deteriorated thereupon.

In addition, in the present specification, an "ambient temperature" is about 3° C. to about 40° C., preferably about 10° C. to about 30° C., more preferably about 15° C. to about 25° C., and most preferably about 23° C.

In the second adhesive resin composition, the phenol novolak-type epoxy resin (C) is a polymer compound having a fundamental structure of a phenol novolak resin which is obtained by acid condensing phenol and formaldehyde, in which an epoxy group is introduced into a part of the structure. An amount of an epoxy group to be introduced per one molecule in the phenol novolak-type epoxy resin is not particularly limited, and since many epoxy groups are introduced into phenolic hydroxy groups existing at the great number in the phenol novolak resin by reacting an epoxy group raw material such as epichlorohydrin and a phenol novolak resin, the phenol novolak-type epoxy resin usually becomes a polyfunctional epoxy resin.

Among them, as the (C) component, a resin having a phenol novolak structure as a fundamental skeleton as well as a bisphenol A structure is preferable. In addition, the bisphenol A structure in the (C) component may be a structure which can be derived from bisphenol A, and hydroxy groups at both ends of bisphenol A may have been substituted with a group such as an epoxy group-containing group.

One example of the (C) component includes a resin represented by the following general formula (1).

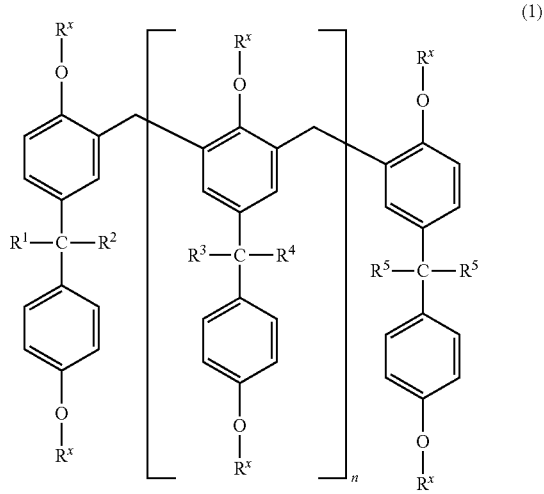

(1)

[In the formula (1), $R^1$ to $R^6$ are each independently a hydrogen atom or a methyl group, n is an integer of 0 to 10, and $R^X$ is a group having an epoxy group.]

In the above-mentioned general formula (1), $R^1$ to $R^6$ are each independently a hydrogen atom or a methyl group. When n is an integer of 2 or more, $R^3$ and $R^4$ may be the same or different.

It is preferable that the resin represented by the above-mentioned general formula (1) satisfies at least any one of the following (i) to (iii).

(i) Both $R^1$ and $R^2$ are methyl groups.
(ii) Both $R^3$ and $R^4$ are methyl groups.
(iii) Both $R^5$ and $R^6$ are methyl groups.

For example, by satisfying the above-mentioned (i), it follows that a carbon atom to which $R^1$ and $R^2$ bind in the above-mentioned general formula (1), and two hydroxyphenyl groups to which the relevant carbon atom bind, constitute a structure which is derived from bisphenol A.

In the above-mentioned general formula (1), $R^X$ is a group having an epoxy group. Examples of the group having an epoxy group include an epoxy group, a combination of an epoxy group and an alkylene group, and the like, and inter alia, a glycidyl group is preferable.

An epoxy equivalent of the (C) component is preferably 100 to 300, and more preferably 200 to 300. An epoxy equivalent (g/eq) is a molecular weight of an epoxy resin per one epoxy group, and means that as this value is smaller, the number of epoxy groups in the resin is larger. By using the (C) component having a relatively small epoxy equivalent, even when an addition amount of the (C) component is relatively small, adhesiveness between the (C) component and an adherend becomes good, and the (C) component and the above-mentioned (A) component are sufficiently crosslinked.

As such (C) component, commercially available products such as jER154, jER157S70, and jER-157S65 manufactured by Mitsubishi Chemical Corporation; EPICLON N-730A, EPICLON N-740, EPICLON N-770, and EPICLON N-775 manufactured by DIC CORPORATION (all are product names) can also be used.

In the second adhesive resin composition, it is preferable that the (A) component is contained at 90 parts by mass to 99.9 parts by mass, whereas the (C) component is contained at 0.1 parts by mass to 10 parts by mass, it is more preferable that the (A) component is contained at 95 parts by mass to 99.9 parts by mass, whereas the (C) component is contained at 0.1 parts by mass to 5 parts by mass, and it is further preferable that the (A) component is contained at 97 parts by mass to 99 parts by mass, whereas the (C) component is contained at 1 part by mass to 3 parts by mass.

The second adhesive resin composition can appropriately contain a miscible additive, an additional resin, a plasticizer, a stabilizer, a coloring agent, and the like, if desired.

It is thought that both of an acid functional group of the (A) component and an epoxy group of the (C) component function as adhesive functional groups to an adherend (particularly, functional group such as hydroxy group possessed by adherend), and thereby, the second adhesive resin composition becomes possible to exert excellent adhesiveness to various adherends such as metal, glass, and plastic.

Additionally, it is thought that a part of an acid functional group of the (A) component and a part of an epoxy group of the (C) component are reacted to form a. crosslinked structure of the (A) component and the (C) component, the strength of the resin is reinforced by this crosslinked structure, and good durability together with excellent adhesiveness is obtained.

[Third Adhesive Resin Composition]

The third adhesive resin composition contains 80 parts by mass to 99.9 parts by mass of an acid-modified polyolefin resin (A) and 0.1 parts by mass to 20 parts by mass of an oxazoline group-containing styrene-based resin (D) having a number average molecular weight of 50,000 to 250,000.

Hereinafter, the acid-modified polyolefin resin (A) may be referred to as "(A) component", and the oxazoline group-containing styrene-based resin (D) may be referred to as "(D) component".

(Acid-Modified Polyolefin Resin (A))

In the third adhesive resin composition, the acid-modified polyolefin resin (A) is the same as the acid-modified polyolefin resin (A) in the above-mentioned first adhesive resin composition.

(Oxazoline Group-Containing Styrene-Based Resin (D))

In the third adhesive resin composition, the oxazoline group-containing styrene-based resin (D) is an oxazoline group-containing styrene-based resin having a number average molecular weight of 50,000 to 250,000.

By possession of an oxazoline group by the (D) component, the oxazoline group of the (D) component and the acid functional group (for example, carboxy group, carboxylic acid group, and the like) of the above-mentioned (A) component are reacted to form a crosslinked structure. For example, in the case where the acid functional group of the (A) component is a carboxy group, a crosslinking reaction shown by the following formula (2) occurs to form an amide ester bond. It is thought that, as a result, it follows that the (D) component reinforces the (A) component which is to be a main resin, crosslinking of the (A) component is more enhanced, and good durability together with excellent adhesiveness is obtained.

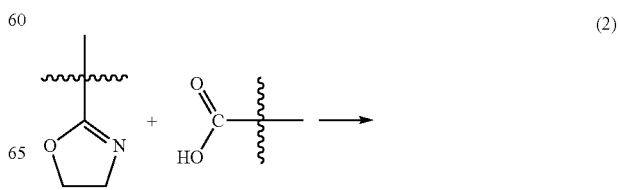

(2)

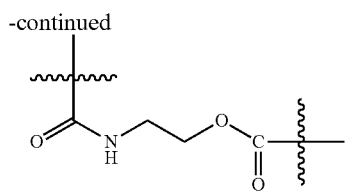

Among them, as the (D) component, a resin which is obtained by copolymerizing a styrene-based monomer and an oxazoline group-containing monomer is preferable.

As the styrene-based monomer, styrene and derivatives thereof can be used. Specifically, examples thereof include styrene; alkylstyrenes such as □-methylstyrene, methylstyrene, dimethylstyrene, trimethylstyrene, ethylstyrene, diethylstyrene, triethyl styrene, propylstyrene, butylstyrene, hexylstyrene, heptyl styrene, and octylstyrene; halogenated styrenes such as chlorostyrene, fluorostyrene, bromostyrene, dibromostyrene, and iodostyrene; and the like. Among them, styrene is preferable.

As far as the oxazoline group-containing monomer is a monomer which contains an oxazoline group and is copolymerizable with the styrene-based monomer, a skeleton thereof is not particularly limited, and a monomer having an oxazoline group and a vinyl group can be suitably used.

Examples of the oxazoline group-containing vinyl monomer include 2-vinyl-2-oxazoline, 5-methyl-2-vinyl-2-oxazoline, 4,4-dimethyl-2-vinyl-2-oxazoline, 2-isopropenyl-2-oxazoline, 4,4-dimethyl-2-isopropenyl-2-oxazoline, 4-acryloyl-oxymethyl-2,4-dimethyl-2-oxazoline, 4-methacryloyloxymethyl-2,4-dimethyl-2-oxazoline, 4-methacryloyloxymethyl-2-phenyl-4-methyl-2-oxazoline, 2-(4-vinylphenyl)-4,4-dimethyl-2-oxazoline, 4-ethyl-4-hyroxymethyl-2-isopropenyl-2-oxazoline, 4-ethyl-4-carboethoxymethyl-2-isopropenyl-2-oxazoline, and the like. Among them, 2-isopropenyl-2-oxazoline is preferable.

As the styrene-based monomer and the oxazoline group-containing monomer, one may be used alone, or two or more may be used by combining them, respectively.

Additionally, the (D) component may contain one or more other monomers, in addition to the styrene-based monomer and the oxazoline group-containing monomer. Other monomers are not particularly limited as far as they are copolymerizable with these monomers, and examples thereof include a (meth)acrylate monomer, a (meth)acrylic ester monomer, a (meth)acrylamide monomer, and the like.

In the (D) component, a constituting ratio of each monomer is not particularly limited, but a resin which is obtained by copolymerizing the oxazoline group-containing monomer at 5% by mass to 50% by mass, and more preferably 10% by mass to 30% by mass, based on all monomers constituting the (D) component is preferable. By using the oxazoline group-containing monomer in the above-mentioned range, the above-mentioned (A) component and (D) component can be sufficiently crosslinked to obtain good durability.

A number average molecular weight of the (D) component is 50,000 to 250,000, preferably 60,000 to 100,000, and further preferably 60,000 to 80,000. By using the (D) component having a number average molecular weight in the above-mentioned range, compatibility between the (A) component and the (D) component is improved, and it becomes possible to sufficiently crosslink the (A) component and the (D) component.

As such (D) component, commercially available products such as EPOCROS RPS-1005 (product name) manufactured by NIPPON SHOKUBAI CO., LTD, can be used.

In the third adhesive resin composition, the (A) component is contained at 80 parts by mass to 99.9 parts by mass, whereas the (D) component is contained at 0.1 parts by mass to 20 parts by mass. Inter glia, it is preferable that the (A) component is contained at 95 parts by mass to 99 parts by mass, whereas the (D) component is contained at 1 part by mass to 5 parts by mass.

In the third adhesive resin composition, since an acid functional group of the (A) component and an oxazoline group of the (D) component are easily reacted by heating, it is not necessary to additionally blend a curing agent which can react with these functional groups, and optionally, a miscible additive, an additional resin, a plasticizer, a stabilizer, a coloring agent, and the like can be appropriately contained.

It is thought that an acid functional group of the (A) component functions as an adhesive functional group to an adherend, and thereby, the third adhesive resin composition becomes possible to exert excellent adhesiveness to various adherends such as metal, glass, and plastic. Additionally, it is thought that a part of an acid functional group of the (A) component and a part of an oxazoline group of the (D) component react with each other to reinforce the (A) component which is to be a main resin, thereby, crosslinking of the (A) component becomes firmer, and good durability together with excellent adhesiveness can be obtained. In addition, when an adherend has a carboxyl group, the oxazoline group also functions as an adhesive functional group.

A thickness of each of the first adhesive layer 14 and the second adhesive layer 15 is preferably 5 μm to 50 μm, and more preferably 10 μm to 30 μm.

Additionally, a total thickness of the first adhesive layer 14 and the second adhesive layer 15 is preferably about 5% to 60% of a thickness of a whole hot-melt adhesive resin film 10 (that is, the total thickness of substrate layer 11, first intermediate layer 12, second intermediate layer 13, first adhesive layer 14, and second adhesive layer 15).

A resin constituting the first adhesive layer 14 and a resin constituting the second adhesive layer 15 may be the same or different in such a range that the first adhesive layer 14 and the second adhesive layer 15 satisfy the above-mentioned adhesiveness.

Since the hot-melt adhesive resin film 10 of the present embodiment is such that the first adhesive layer 14, the first intermediate layer 12, the substrate layer 11 having heat resistance, the second intermediate layer 13, and the second adhesive layer 15 are laminated in this order, and the first adhesive layer 14 and the second adhesive layer 15 are formed of a composition having the acid-modified polyolefin resin and the epoxy group-containing resin or a composition having the acid-modified polyolefin resin and the oxazoline group-containing resin, it has the excellent adhesive force and durability, to various adherends such as metal, glass, and plastic.

[Method of Producing Hot-Melt Adhesive Resin Film]

A method of producing the hot-melt adhesive resin film which is one embodiment of the present invention includes, for example, a coextrusion method.

When the hot-melt adhesive resin film is produced using a coextrusion method, a resin constituting the substrate layer 11, a resin constituting the first intermediate layer 12 and the second intermediate layer 13, and a resin constituting the first adhesive layer 14 and the second adhesive layer 15 are each extruded from different extruders, respectively, these resins are laminated so as to be in an order of first adhesive layer 14/first intermediate layer 12/substrate layer 11/second intermediate layer 113/second adhesive layer 15 to form a composite film in a die, and the composite film is stretched to obtain a hot-melt adhesive resin film 10 having a predetermined thickness.

When as the resin constituting the first intermediate layer 12 and the second intermediate layer 13, a plurality of materials is used by combining them, those materials are melted and kneaded.

As an apparatus for melting and kneading, a single-screw extruder, a multi-screw extruder, a Banbury mixer, a plast mill, a heating roll kneader or the like can be used.

It is preferable that a heating temperature at melting and kneading is selected from such a range that the resin constituting the first intermediate layer 12 and the second intermediate layer 13 is sufficiently melted and not thermally degraded.

In addition, it is possible to measure a kneading temperature by a method of contacting a resin composition in the melted state immediately after extrusion from a melting and kneading apparatus, with a thermocouple, or the like.

When as the resin constituting the first adhesive layer 14 and the second adhesive layer 15, a first adhesive resin composition is used, an acid-modified polyolefin resin (A) and an epoxy group-containing polyolefin-based resin (B) are melted and kneaded.

The acid-modified polyolefin resin (A) and the epoxy group-containing polyolefin-based resin (B) are the same as the above-mentioned (A) component and (B) component, respectively. By melting and kneading the first adhesive resin composition containing the above-mentioned (A) component and the above-mentioned (B) component using the known apparatus, the (A) component and the (B) component can be reacted.

As an apparatus for melting and kneading, a single-screw extruder, a multi-screw extruder, a Banbury mixer, a plast mill, a heating roll kneader or the like can be used. In order to suppress degradation of an epoxy group of the (B) component at a reaction between the (A) component and the (B) component, it is desirable that volatile components which can react with an epoxy group such as moisture are removed to the outside of the apparatus in advance, and when volatile components are generated during a reaction, they are discharged to the outside of the apparatus by deaeration or the like as needed.

When the acid-modified polyolefin resin (A) has an acid anhydride group as the acid functional group, this is preferable because reactivity with an epoxy group of the epoxy group-containing polyolefin-based resin (B) is high, and a reaction becomes possible under the milder condition.

A heating temperature at melting and kneading is preferably selected from a range of 240° C. to 300° C. in point that the (A) component and the (B) component are sufficiently melted and are not thermally degraded.

In addition, it is possible to measure a kneading temperature by a method of contacting the first adhesive resin composition in the melted state immediately after extrusion from a melting and kneading apparatus, with a thermocouple, or the like.

When as the resin constituting the first adhesive layer 14 and the second adhesive layer 15, the second adhesive resin composition is used, an acid-modified polyolefin resin (A) and a phenol novolak-type epoxy resin (C) are melted and kneaded.

The acid-modified polyolefin resin (A) and the phenol novolak-type epoxy resin (C) are the same as the above-mentioned (A) component and (C) component, respectively. By melting and kneading the second adhesive resin composition containing the above-mentioned (A) component and the above-mentioned (C) component using the known apparatus, the (A) component and the (C) component can be reacted.

As an apparatus for melting and kneading, a single-screw extruder, a multi-screw extruder, a Banbury mixer, a plast mill, a heating roll kneader or the like can be used. In order to suppress degradation of an epoxy group of the (C) component at a reaction between the (A) component and the (C) component, it is desirable that volatile components which can react with an epoxy group such as moisture are removed to the outside of an apparatus in advance, and when volatile components are generated during a reaction, they are discharged to the outside of the apparatus by deaeration or the like as needed.

When the acid-modified polyolefin resin (A) has an acid anhydride group as the acid functional group, this is preferable because reactivity with an epoxy group of the phenol novolak-type epoxy resin (C) is high, and a reaction becomes possible under the milder condition.

It is preferable that a heating temperature at melting and kneading is selected from a range of 240° C. to 300° C. in point that the (A) component and the (C) component are sufficiently melted and are not thermally degraded.

In addition, it is possible to measure a kneading temperature by a method of contacting the second adhesive resin composition in the melted state immediately after extrusion from a melting and kneading apparatus, with a thermocouple, or the like.

When as the resin constituting the first adhesive layer 14 and the second adhesive layer 15, the third adhesive resin composition is used, an acid-modified polyolefin resin (A) and an oxazoline group-containing styrene-based resin (D) are melted and kneaded.

The acid-modified polyolefin resin (A) and the oxazoline group-containing styrene-based resin (D) are the same as the above-mentioned (A) component and (D) component, respectively. By melting and kneading the third adhesive resin composition containing the above-mentioned (A) component and the above-mentioned (D) component using the known apparatus, the (A) component and the (D) component can be reacted.

As an apparatus for melting and kneading, a single-screw extruder, a multi-screw extruder, a Banbury mixer, a plast mill, a heating roll kneader or the like can be used. In order to suppress degradation of an epoxy group of the (D) component at a reaction between the (A) component and the (D) component, it is desirable that volatile components which can react with an epoxy group such as moisture are removed to the outside of an apparatus in advance, and when volatile components are generated during a reaction, they are discharged to the outside of the apparatus by deaeration or the like as needed.

When the acid-modified polyolefin resin (A) has an acid anhydride group as the acid functional group, this is preferable because reactivity with an oxazoline group of the phenol novolak-type epoxy resin (D) is high, and a reaction becomes possible under the milder condition.

It is preferable that a heating temperature at melting and kneading is selected from a range of 240° C. to 300° C. in point that the (A) component and the (D) component are sufficiently melted and are not thermally degraded.

In addition, it is possible to measure a kneading temperature by a method of contacting the second adhesive resin composition in the melted state immediately after extrusion from a melting and kneading apparatus, with a thermocouple, or the like.

EXAMPLES

The present invention will be further specifically illustrated below by way of Examples, but the present invention is not limited to the following Examples.

Examples 1 to 15 and Comparative Examples (Adhesive Resin Film)

After materials (a), (b), and (c) shown in Tables 1 and 2 were melted and kneaded at 250° C. for 2 minutes at addition amounts shown in Tables 1 and 2, five layers of a first adhesive layer, a first intermediate layer, a substrate layer, a second intermediate layer, and a second adhesive layer were formed into a film so that those layers were laminated in this order, to obtain a hot-melt adhesive resin film having a predetermined thickness. In addition, in Comparative Examples 2 and 3, three layers of a first adhesive layer, a substrate layer, and a second adhesive layer were laminated in this order without providing intermediate layers. Film thickness of respective layers were 20 μm in the first adhesive layer, 15 μm in the first intermediate layer, 75 μm in the substrate layer, 15 μm in the second intermediate layer, and 20 μm in the second adhesive layer.

The material (a) is a material constituting the substrate layer, the material (b) is a material constituting the first intermediate layer and the second intermediate layer, and the material (c) is a material constituting the first adhesive layer and the second adhesive layer.

In Table 1, each abbreviation has the following meaning, respectively, A numerical value in [ ] is a blending amount (part by mass).
(Substrate Layer)
  TPX: Layer formed of methylpentene polymer
  COP: Layer formed of cyclic olefin polymer
  CPP: Layer formed of polypropylene resin (PF380A, manufactured by SUN AROMA CO., LTD.)
In Table 2, a film was formed as a film including an inorganic filler at a described ratio.
(Adhesive Components)
  (A): Maleic anhydride-modified polypropylene (melting point 140° C.)
  (B): "Modiper A4100" (product name, manufactured by NOF CORPORATION) (graft polymer of ethylene-glycidyl methacrylate copolymer and polystyrene; ratio of glycidyl methacrylate monomer based on all monomers in main chain=70% by mass; melting point 97° C.)
  (C) "jER157S70" (product name, manufactured by Mitsubishi Chemical Corporation) (phenol novolak-type epoxy resin having bisphenol A structure; softening point=70° C.; epoxy equivalent=210)
  (D) "EPOCROS RPS-1005" (product name, manufactured by NIPPON SHOKUBAI CO., LTD.) (resin which was obtained by copolymerizing styrene and 2-isopropenyl-2-oxazoline; number average molecular weight=70,000)
(Intermediate Layer)
  (E) SEBS resin G1657M (product name, Joseph Clayton & Sons, Ltd.)
  (F) Metallocene-based polyethylene: Harmolex NF325N (product name, manufactured by Japan Polyethylene Corporation)
  (G) Metallocene-based polypropylene: WINTEC WFW4 (product name, manufactured by Japan Polypropylene Corporation)
  (H-I) Methylpentene polymer: MX004 (product name, manufactured by Mitsui Chemicals, Inc.)
  (I) Polybutene-based elastomer: BL2491 (product name, manufactured by Mitsui Chemicals, Inc.)
  (J) Polypropylene: ADMER QE060 (product name, manufactured by Mitsui Chemicals, Inc.)
(Evaluation of Adhesiveness Between Metal, and First Adhesive Layer and Second Adhesive Layer—Evaluation of Adhesiveness 1)

Each of adhesive resin films of Examples 1 to 12 and Comparative Examples 1 to 5 which had been excised into 10 mm×10 mm was laminated on a stainless plate having a thickness of 5 mm, and a length and a width of 30 mm×10 mm, an end part of an aluminum foil which had been cut into a thickness of 30 μm, and a length and a width of 30 mm×10 mm was placed thereon, and they were stuck at 150° C. for 5 seconds while a pressure of 0.5 MPa was applied, and thereby, a laminate having an adhesion area of 100 mm² was obtained.

The resulting laminate was soaked in hot water at 95° C. for 300 hours, an end part of the laminate after soaking was pulled with a clamp of a tensile testing machine at a rate of 300 mm/min in a direction of 90°, and the peeled state was observed visually. The results are shown in Table 1.

Based on the following evaluation criteria, peeling between metal and the laminate was observed.
  ○: Peeling at an adhered surface between metal and the laminate did not occur until an aluminum foil was ruptured.
  Δ: Peeling slightly occurred at an adhered surface between metal and the laminate before an aluminum foil was ruptured.
  x: Peeling was easily generated at an adhered surface between metal and the laminate before an aluminum foil was ruptured, and the peeling-off was observed.
(Evaluation of Adhesiveness Between Layers of Adhesive Resin Film—Evaluation of Adhesiveness 2)

Simultaneously with the above-mentioned evaluation of adhesiveness between metal, and first adhesive layer and second adhesive layer, the state between layers of the laminate was observed and evaluated.
  ○: Peeling between layers of the laminate did not occur until an aluminum foil was ruptured.
  Δ: Peeling occurred between layers of the laminate before an aluminum foil was ruptured.
  x: Peeling was easily generated in the laminate before an aluminum foil was ruptured, and the peeling-off was observed.

In addition, in the case where both of evaluation of adhesiveness 1 and evaluation of adhesiveness 2 are "○" in the evaluations of adhesiveness, this indicates that both of peeling between metal and the laminate and peeling between layers of the laminate did not occur until an aluminum foil was ruptured. In the case where there is "○" in either of evaluation of adhesiveness 1 or evaluation of adhesiveness 2, and there is "Δ" or "x" in either of them, this indicates that either peeling was observed, or peeling was observed between layers of either of them. Additionally, in the case where there is "x" in both of evaluation of adhesiveness 1 and evaluation of adhesiveness 2, this indicates that intense peeling was observed between layers of all of them.
(Evaluation of Durability of Laminate)

Each of adhesive resin films of Examples 1 to 12 and Comparative Examples 1 to 5 which had been excised into 10 mm×10 mm was laminated on an aluminum foil having a thickness of 30 μm and a length of 30 mm×a width of 30 mm, an end part of a stainless foil which had been cut into a thickness of 300 μm and a length of 30 mm×a width of 30 mm was placed thereon, and they were stuck at 150° C. for 5 seconds while a pressure of 0.5 MPa was applied, and thereby, a laminate was obtained.

The resulting laminate was placed into dried high temperature thermos equipment at 120° C. for 1,000 hours. After placement, the laminate was taken out, the state of the laminate was observed, and peeling was observed visually. The results are shown in Table 1.

Evaluation was performed based on the following evaluation criteria.
⊙: There was no visible peeling and the state was good.
○: Visible prominent peeling was not observed.
Δ: Peeling was observed at several places.
x: Peeling was observed on a whole surface.
(Shape Retainability at Adhesion)

Each of adhesive resin films of Examples 1 to 12 and Comparative Examples 1 to 5 which had been excised into 10 mm×10 mm was laminated on an aluminum foil having a thickness of 30 μm and a length of 30 mm×a width of 30 mm, an end part of a stainless foil which had been cut into a thickness of 300 μm and a length of 30 mm×a width of 30 mm was placed thereon, and they were stuck at 150° C. for 5 seconds while a pressure of 0.5 MPa was applied, and thereby, a laminate was obtained.

The state of the laminate immediately after lamination was observed visually, and the peeling-off was observed visually. The results are shown in Table 1.

Evaluation was performed based on the following evaluation criteria.
⊙: Visible distortion of the laminate was not observed.
○: Visible intense distortion was not observed.
Δ: Distortion of the laminate was observed.
x: A whole surface of the laminate was intensely distorted or irregularities were intense.

TABLE 1

| | (a) Substrate layer | (E) SEBS resin | (b) Intermediate layer | | | | | (c) Adhesive layer Resin component |
|---|---|---|---|---|---|---|---|---|
| | | | (F) Metallocene-based polyethylene | (G) Metallocene-based polypropylene | (H) Methylpentene polymer | (I) Polybutene-based elastomer | (J) Polypropylene | |
| Example 1 | TPX | — | — | — | [60] | [20] | [20] | (A) [98.0] |
| Example 2 | TPX | — | — | — | [60] | [20] | [20] | (A) [98.0] |
| Example 3 | TPX | — | — | — | [60] | [20] | [20] | (A) [98.0] |
| Example 4 | TPX | — | — | — | [60] | — | [40] | (A) [98.0] |
| Example 5 | COP | [20] | [50] | [30] | — | — | — | (A) [98.0] |
| Example 6 | COP | [20] | [50] | [30] | — | — | — | (A) [98.0] |
| Example 7 | COP | [20] | [50] | [30] | — | — | — | (A) [98.0] |
| Example 8 | COP | [20] | [30] | [50] | — | — | — | (A) [98.0] |
| Example 9 | COP | [100] | — | — | — | — | — | (A) [98.0] |
| Example 10 | COP | [20] | [50] | [30] | — | — | — | (A) [100] |
| Example 11 | TPX | — | — | — | [60] | [20] | [20] | (A) [100] |
| Comparative Example 1 | CPP | [20] | [50] | [30] | — | — | — | (A) [98.0] |
| Comparative Example 2 | TPX | | | None | | | | (A) [98.0] |
| Comparative Example 3 | CPP | | | None | | | | (A) [98.0] |
| Comparative Example 4 | TPX | | | None | | | | (A) [100] |
| Comparatve Example 5 | CPP | | | None | | | | (A) [100] |

| | (c) Adhesive layer Additive component | Evaluation of adhesiveness between metal and surface layer | Evaluation of adhesiveness between layers of adhesive resin film - evaluation of adhesiveness 1 | Evaluation of durability of laminate evaluation of adhesiveness 2 | Shape retainability at adhesion |
|---|---|---|---|---|---|
| Example 1 | (B) [2.0] | ○ | ○ | ○ | ⊙ |
| Example 2 | (C) [2.0] | ○ | ○ | ○ | ⊙ |

TABLE 1-continued

| | | | | | |
|---|---|---|---|---|---|
| Example 3 | (D) [2.0] | ○ | ○ | ○ | ○ |
| Example 4 | (B) [2.0] | ○ | Δ | ○ | ○ |
| Example 5 | (B) [2.0] | ○ | ○ | ⊙ | ⊙ |
| Example 6 | (C) [2.0] | ○ | ○ | ⊙ | ○ |
| Example 7 | (D) [2.0] | ○ | ○ | ⊙ | ○ |
| Example 8 | (B) [2.0] | ○ | ○ | ⊙ | ⊙ |
| Example 9 | (B) [2.0] | ○ | Δ | ○ | Δ |
| Example 10 | — | Δ | ○ | Δ | Δ |
| Example 11 | — | Δ | ○ | Δ | Δ |
| Comparative Example 1 | (B) [2.0] | ○ | ○ | X | X |
| Comparative Example 2 | (B) [2.0] | ○ | X | X | Δ |
| Comparative Example 3 | (B) [2.0] | ○ | ○ | X | X |
| Comparative Example 4 | — | X | X | X | Δ |
| Comparatve Example 5 | — | X | ○ | X | X |

TABLE 2

| | (a) Substrate layer | | (b) Intermediate layer | | | |
|---|---|---|---|---|---|---|
| | Polymer | Inorganic filler | (E) SEBS resin | (F) Metallocene-based polyethylene | (G) Metallocene-based polypropylene | (H) Methylpentene polymer |
| Example 12 | COP | None | [20] | [50] | [30] | — |
| Example 13 | TPX | None | — | — | — | [60] |
| Example 14 | COP | Talc [10] | [20] | [50] | [30] | — |
| Example 15 | TPX | Silica [10] | — | — | — | [60] |

| | (b) Intermediate layer | | (c) Adhesive layer | | Evaluation results |
|---|---|---|---|---|---|
| | (I) Polybutene-based elastomer | (J) Polypropylene | Resin component | Additive component | Shape retainability at adhesion |
| Example 12 | — | — | (A) [90.0] | (B) [10.0] | ○ |
| Example 13 | [20] | [20] | (A) [90.0] | (B) [10.0] | ○ |
| Example 14 | — | — | (A) [90.0] | (B) [10.0] | ⊙ |
| Example 15 | [20] | [20] | (A) [90.0] | (B) [10.0] | ⊙ |

From the results shown in Table 1, it could be confirmed in evaluation of the laminate using the hot-melt adhesive resin film of the present invention that the hot-melt adhesive resin film of the present invention has excellent adhesiveness to metal. Additionally, it could also be confirmed that the laminate using the adhesive resin film of the present invention has good adhesion between metal and the adhesive layer, and also has excellent adhesiveness between layers of the hot-melt adhesive resin film. It could be confirmed that the film and the laminate have excellent durability even after severe durability evaluation, and it was seen that the hot-melt adhesive resin film is hardly warped, and the present adhesive resin film is a hot-melt adhesive resin film which is also useful in production of the laminate.

In Comparative Examples 1, 3, and 5, the substrate layer includes an undrawn polypropylene film, and it was seen that adhesiveness between the intermediate layer or the surface layer is good due to being polypropylene, but since undrawn polypropylene is a material having low heat resistance, a thickness and a shape of the laminate could not be retained.

Additionally, in Comparative Examples 2 and 4, the substrate layer includes an undrawn polypropylene film, and it was seen that since undrawn polypropylene is a material having low heat resistance, distortion is seen in the laminate after lamination, or there is unevenness in a thickness, and a shape cannot be retained.

Since the hot-melt adhesive resin films of Example 11 and Example 1.2 do not include an additive component in the adhesive layer, adhesiveness with the metal layer was inferior as compared with Examples 1 to 10.

From the results shown in Table 2, it was seen that shape retainability at adhesion is improved by inclusion of the inorganic filler in the substrate layer.

The invention claimed is:

1. A hot-melt adhesive resin film comprising a first adhesive layer, a first intermediate layer, a substrate layer having heat resistance, a second intermediate layer, and a second adhesive layer, which are laminated in this order,
wherein said first adhesive layer and said second adhesive layer include an acid-modified polyolefin resin (A) having a melting point of 140° C. to 180° C.,
said first intermediate layer and said second intermediate layer include a methylpentene polymer, and
said substrate layer is a layer formed of methylpentene polymer.

2. The hot-melt adhesive resin film according to claim 1, wherein said first adhesive layer and said second adhesive layer include, as a material for forming the layers, a composition having the acid-modified polyolefin resin (A) and an epoxy group-containing resin or a composition having the acid-modified polyolefin resin (A) and an oxazoline group-containing resin.

3. The hot-melt adhesive resin film according to claim 1, wherein said first adhesive layer and said second adhesive layer contain 80 parts by mass to 99.9 parts by mass of the acid-modified polyolefin resin (A), and 0.1 parts by mass to 20 parts by mass of an epoxy group-containing polyolefin-based resin (B) having a main chain which is obtained by copolymerizing an olefin compound and an epoxy group-containing vinyl monomer and a side chain bound to said main chain, and having a melting point of 80° C. to 120° C.

4. The hot-melt adhesive resin film according to claim 1, wherein said first adhesive layer and said second adhesive layer contain 90 parts by mass to 99.9 parts by mass of the acid-modified polyolefin resin (A), and 0.1 parts by mass to 10 parts by mass of a phenol novolak epoxy resin (C) which is solid at an ambient temperature.

5. The hot-melt adhesive resin film according to claim 1, wherein said first adhesive layer and said second adhesive layer contain 80 parts by mass to 99.9 parts by mass of the acid-modified polyolefin resin (A), and 0.1 parts by mass to 20 parts by mass of an oxazoline group-containing styrene-based resin (D) having a number average molecular weight of 50,000 to 250,000.

6. The hot-melt adhesive resin film according to claim 1, wherein said first intermediate layer and said second intermediate layer further include at least one selected from the group consisting of a polybutene-based elastomer, and polypropylene.

7. The hot-melt adhesive resin film according to claim 1, wherein said substrate layer comprises an inorganic filler.

8. A method of producing the hot-melt adhesive resin film as defined in claim 1, the method comprising producing the hot-melt adhesive resin film by a coextrusion method so as to laminate the first adhesive layer, the first intermediate layer, the substrate layer having heat resistance, the second intermediate layer, and the second adhesive layer in this order.

* * * * *